Figure 1:
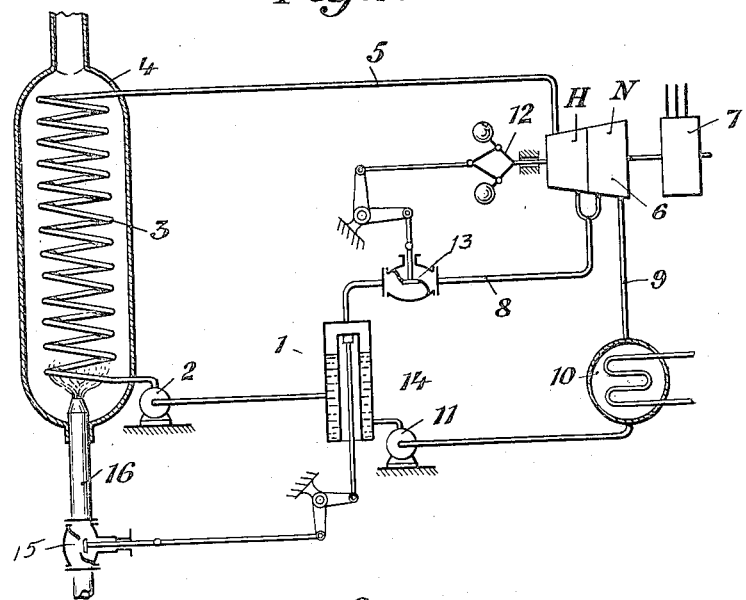

Patented Dec. 4, 1934

1,983,275

UNITED STATES PATENT OFFICE 1,983,275

STEAM POWER PLANT

Hans Conrad Egloff, Winterthur, Switzerland, assignor to firm of Sulzer Frères Societe Anonyme, Winterthur, Switzerland Application July 6, 1933, Serial No. 679,167
In Switzerland August 20, 1932

2 Claims. (Cl. 60—105)

This invention relates to steam power plants of the kind comprising a steam generator of small liquid content and a steam engine plant working with feed water heated by extracted steam.

Steam power plants of similar kinds as hitherto known are regulated by altering the water supply to the feed water heater in accordance with the pressure in the steam generator in such a manner that the feed water is heated to a definite temperature. But such a method is disadvantageous in steam generators of small liquid content as fluctuations of the steam pressure may cause the water to travel along with the steam.

To avoid this disadvantage according to the invention two devices are provided one of which regulates the output of the engine plant by altering the quantity of steam led from the engine plant to the feed-water heater in accordance with the load on the engine, whilst the other device regulates the output of the steam generator in accordance with the temperature of the feed-water heater.

As the load governor of the steam engine plant regulates the quantity of steam extracted from the engine and not the quantity of steam supplied to the engine, shocks resulting from sudden fluctuations in the load of the engine plant are not carried back to the steam generator and thereby the travel of the water along with the steam is avoided.

The plant according to the invention differs from steam power plants of similar kinds as hitherto known also therein that the regulation of the extracted steam is transferred to the regulation of the heat supplied to the steam generator in accordance with the temperature of the feed-water heater. The extraction of steam from the engine plant is so regulated that when the load on the engine increases, less steam, and when the load on the engine decreases, more steam is extracted. The output of the steam generator is regulated in such a way that when the temperature of the feed-water heater increases, the output of the steam generator is reduced, and when the temperature decreases, the output is increased.

Through the cooperation of the regulation of the steam extracted from the engine plant in accordance with the load of the engine plant with the regulation of the output of the steam generator in accordance with the temperature of the feed-water heater the new technical effect is obtained that the working of the engine plant may be adapted instantaneously to all load variations without reflecting shocks to the steam generator and that the working of the steam generator without affecting the engine plant may be adapted to the steam consumption so slowly that no travel of the water along with the steam occurs.

Two arrangements according to the invention are illustrated diagrammatically and by way of example in the accompanying drawing.

Figure 2:
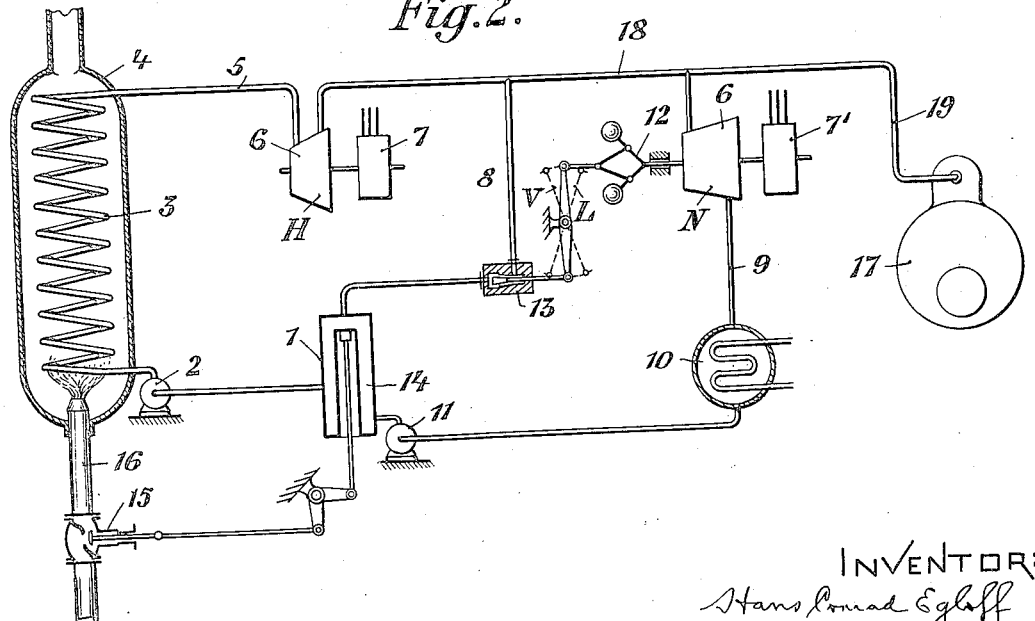

In this drawing,

Fig. 1 is a schematic lay-out of one advantageous plant embodying the present invention, and Fig. 2 is a similar view of a modification.

In the examples shown in Figs. 1 and 2, the water supply is drawn from a feed-water heater 1 by a pump 2 which pumps the feed-water into the tube 3 of a steam generator 4. The steam is delivered through a delivery pipe 5 to the steam engine plant 6 having a high pressure stage H and a low pressure stage N and which drives an electric generator 7 (Fig. 1) or electric generators 7 and 7' (Fig. 2). Part of the steam, after expansion in the high pressure stage H, passes through a pipe 8 to the feed water heater 1, the remainder of the steam being expanded in the low pressure stage N from which it passes through a pipe 9 to a condenser 10.

In the plant shown in Fig. 2 steam is led to the low pressure stage N of the steam engine plant through the pipe 19 from a furnace heated low pressure steam generator 17 as well as through the pipe 18 from the high pressure stage.

According to the invention the quantity of steam extracted from the steam engine plant 6 is passed to the feed-water heater 1 of the steam generator 4 and two devices (12, 13 and 14, 15) are provided for regulating the working of the steam generator. The first device (12, 13) regulates the quantity of steam led to the feed-water heater in accordance with the load on the engine, and the second device (14, 15) regulates the output of the steam generator in accordance with the temperature of the feed-water heater 1.

When the load on the engine 6 increases the lever connecting the governor 12 to the valve 13 is moved towards the position V so that the supply of steam through the pipe 8 to the feed-water heater 1 and therefore the quantity extracted from the engine is decreased. Conversely, when the load on the engine decreases, the said lever is moved towards the position L whereby the quantity of steam extracted from the engine and supplied to the feed-water heater 1 is increased.

The temperature of the feed-water heater 1 alters on the one hand in accordance with the rate at which condensate is delivered by the condensate pump 11 from the condenser 10 and on the other hand in accordance with the rate at which steam is supplied to the feed liquid heater through the pipe 8. The control member of the furnace 16 may be adjusted in accordance with the temperature of the feed-water heater as indicated by the control device 14.

Through the cooperation of devices 12, 13 and 14, 15 a new technical effect is obtained in so far that the steam generator, by means of the steam introduced from the feed-water heater and by means of the devices 12, 13 and 14, 15, can more quickly than hitherto take up and deal with suddent shocks due to fluctuations in the load on the steam engine plant. By suitably increasing the quantity of steam passed to the feed-water heater or by increasing the excess of steam from the high pressure part of the steam engine plant, the flexibility of the whole installation may be increased within wide limits without any loss of heat. The low pressure stage of the steam engine plant may consequently be smaller, in consequence of which the efficiency of the whole installation is increased.

Finally the steam is utilized for generating power in the zone which is most favourable for the power process and for heating the feed water under the most favourable conditions for heat transmission.

I claim:

1. In a steam power plant including a steam generator of relatively small liquid-content supplied with feed water and having a feed-water heater; a steam-engine unit operatively connected to the generator and having steam extraction means, means for heating the feed-water of the steam generator by means of steam extracted from the steam-engine unit, a device for regulating the output of the steam engine unit by alteration of the quantity of steam led from the steam engine unit to the feed-water heater in accordance with the speed of the engine unit, and a device for regulating the output of the steam generator in accordance with the temperature of the feed-water heater.

2. A steam power plant as claimed in claim 1, in which the device for regulating the generator output consists in a means for controlling the supply of fuel to the generator, to thereby directly regulate the output of the steam-generator.

HANS CONRAD EGLOFF.